United States Patent [19]

Nielsen

[11] 3,777,762

[45] Dec. 11, 1973

[54] PACEMAKER WITH CONTINUOUSLY ADJUSTABLE OUTPUT AMPLITUDE

[75] Inventor: Lars Stig Nielsen, Copenhagen, Denmark

[73] Assignee: Christian Rovsing A/S, Copenhagen, Denmark

[22] Filed: Jan. 8, 1971

[21] Appl. No.: 104,952

Related U.S. Application Data

[63] Continuation-in-part of Ser. No. 53,557, July 9, 1970, Pat. No. 3,669,120.

[30] Foreign Application Priority Data

Dec. 22, 1970 Denmark ................................ 6512

[52] U.S. Cl. .............................. 128/419 P, 128/422

[51] Int. Cl. ............................................ A61n 1/36

[58] Field of Search ................ 128/419 P, 421, 422, 128/2.05 P, 2.06 R, 2.1 A, 2.05 R

[56] References Cited

UNITED STATES PATENTS

| | | | |
|---|---|---|---|
| 3,717,522 | 2/1973 | Van Den Berg | 128/419 P |
| 3,517,663 | 6/1970 | Bowers et al. | 128/419 P |
| 3,241,556 | 3/1966 | Zacouto | 128/419 P |
| 3,195,540 | 7/1965 | Waller | 128/419 P |
| 3,082,414 | 3/1963 | Papaminas | 128/2.05 P |
| 3,431,912 | 3/1969 | Keller, Jr. | 128/419 P |

*Primary Examiner*—William E. Kamm
*Attorney*—Fleit, Gipple & Jacobson

[57] ABSTRACT

A pacemaker having an output control circuit which is adapted when activated to control the produced pace impulses in such a manner that the amplitude of each impulse is slightly less than that of the preceding impulse. The control circuit can be activated and deactivated from outside, either by suitable hospital equipment or manually by a surgeon. It permits the threshold value of the heart to be determined without surgical operation by ascertaining the smallest pace impulse that causes heart contraction.

10 Claims, 5 Drawing Figures

PACEMAKER WITH CONTINUOUSLY ADJUSTABLE OUTPUT AMPLITUDE

Figures 1, 2:
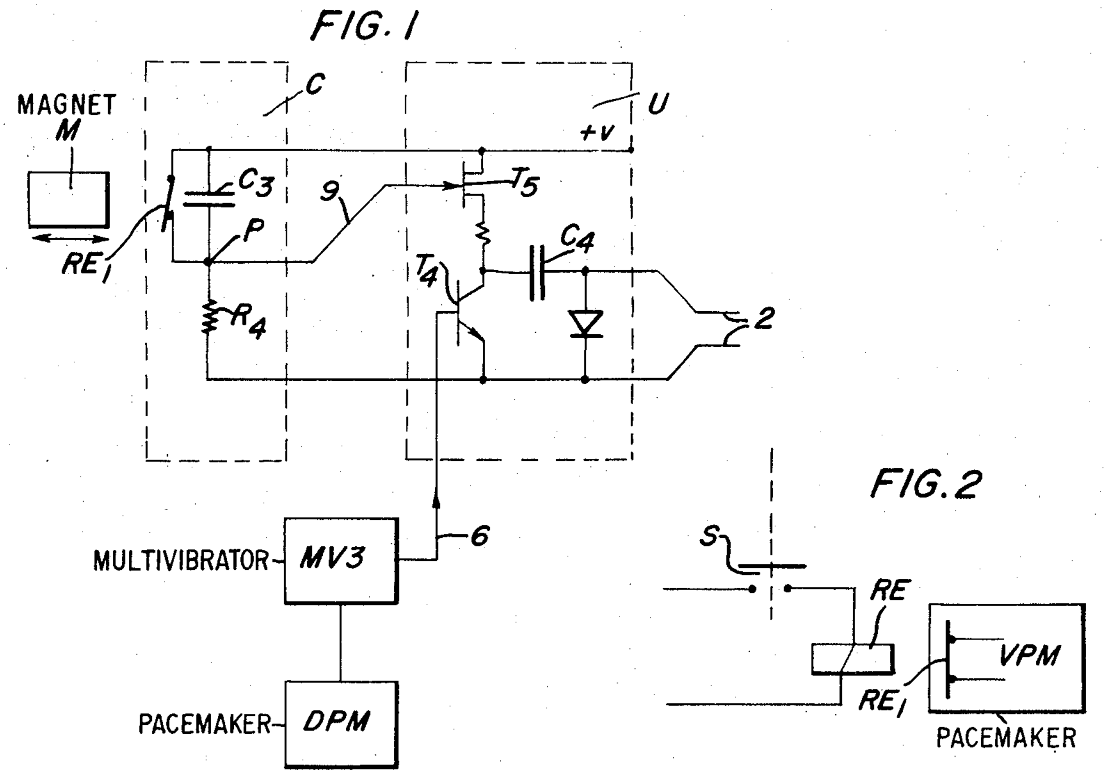

This application is a continuation-in-part of application Ser. No. 53,557 filed July 9, 1970, now U. S. Pat. No. 3,669,120.

U.S. Pat. No. 3,669,120 relates to a heartpacer comprising a pulse generator for producing heart stimulating pacing pulses of substantially fixed frequency and a detector adapted to detect the heart pulses that trigger muscular contractions of the heart and to control the pulse generator so that it produces a pacing pulse on the absence of a heart pulse for a predetermined period, and the characteristic feature of the PACEMAKER according to the patent is that it comprises means for gradual reduction of the amplitude of selected pacing pulses and means for producing a new pacing pulse of predetermined amplitude on the absence of a heart pulse for a certain period after the provision of a reduced pacing pulse.

This construction of the PACEMAKER involves the advantage that the smallest pacing pulse emitted by the PACEMAKER will be a measure of the actual threshold value of the heart, which can thus be determined currently without surgical operation.

The present invention is based on the recognition that the same effect can be achieved also where the PACEMAKER is not of the demand type, but for instance a simple fixed-rate PACEMAKER, and without providing means for ascertaining the absence of a heart pulse for a certain period after the emission of a reduced pacing pulse.

The invention thus relates to a PACEMAKER of the type comprising a pulse generator for producing heart stimulating pacing pulses of a substantially fixed frequency, and this PACEMAKER is characteristic in that it comprises first means for the gradual reduction of the amplitude of selected pacing pulses of a predetermined fixed or relative value relatively to the preceding pacing pulse and means adapted on being activated to connect or disconnect the said first means. This construction constitutes a considerable simplification of the PACEMAKER covered in U.S. Pat. No. 3,699,120. Instead of being activated by specific circuits in the implanted PACEMAKER, the means for causing the generation of a pacing pulse of predetermined amplitude may themselves be adapted to be activated externally, either automatically by means of hospital equipment particularly suited for this purpose, such as a cardiograph, or manually by a surgeon controlling the patient's pulse, in which case the PACEMAKER will normally work with substantially constant pulse amplitude, i.e., as a conventional fixed rate or demand PACEMAKER.

Like the PACEMAKER of the U.S. Pat. No. 3,669,120 and with the same advantageous effects, the PACEMAKER of the present invention may be provided with an output circuit comprising a condenser connected in series with an electronic switch and a charging circuit for charging the condenser to a controlable potential and with a dosage circuit comprising a dosage condenser the voltage of which controls the potential to which the output condenser is charged and which is connected to a charging circuit and a discharging circuit.

The discharging circuit may form a short-circuiting circuit connected in parallel with the dosage condenser and comprising a switch; this is a very simple manner of putting the amplitude reduction device into and out of operation, namely by opening and closing the switch, which in the closed state short-circuits the dosage condenser and makes it inactive so that the generated pacing pulses will be of substantially constant amplitude.

In a particularly simple design of the PACEMAKER the said switch is a reed contact, and for activating this contact there is provided a device comprising or formed by a magnetic member, which may be an electromagnet or a permanent magnet as found in the equipment of any medical practitioner.

The risk of unintentional activation involved by the use of a magnetically activatable switch may be substantially reduced by introducing an electronic switch provided with a control circuit and a device adapted to activate the control circuit without being galvanically connected thereto. The control circuit may then in various ways be made selective with respect to external influences.

This selectivity is obtained in a relatively simple manner where the control circuit comprises a tuned high frequency circuit and a rectifier and the activating device comprises a high frequency generator. But also this construction involves a certain risk of unintentional activation produced by electromagnetic alternating fields outside the operator's control. A far greater safety will be obtained by providing a reed contact in the control circuit and a relay coil in the activating device and adapting the control circuit so that the switch is activated when and only when the high frequency circuit and the reed contact are activated simultaneously, the danger of simultaneous presence of a sufficiently strong magnetic field and electromagnetic oscillations of the predetermined frequency being very slight.

In another construction of the PACEMAKER which also affords a high degree of security against unintentional activation of the switch the control circuit comprises a piezo-electric crystal element set to ultrasonic frequency with an amplifier and rectifier connected thereto while the activating device comprises an ultrasonic generator.

In all constructions where the PACEMAKER is provided with a control circuit which is externally activated by means of an activating device the activation may be produced automatically in accordance with the patient's requirements by adapting the activating device to be controlled by a monostable multivibrator which is activated by a heart pulse detector or a heart contractions detector.

Figures 3, 5:
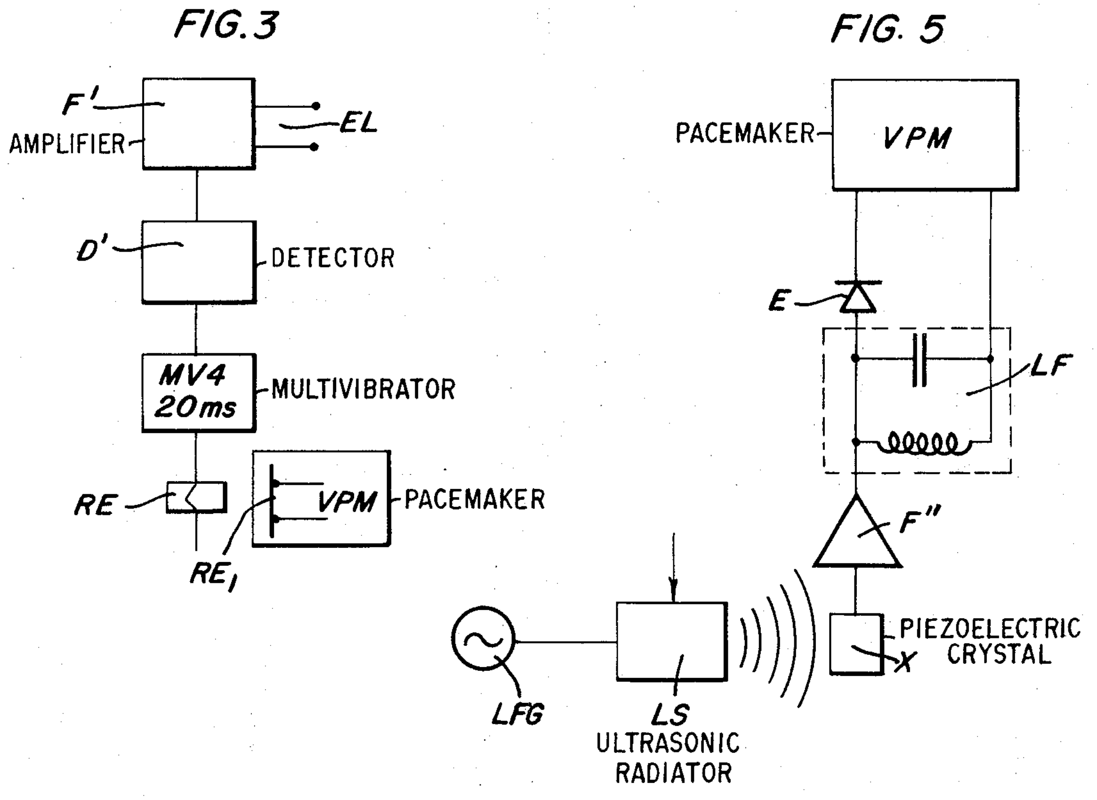
Figure 4:
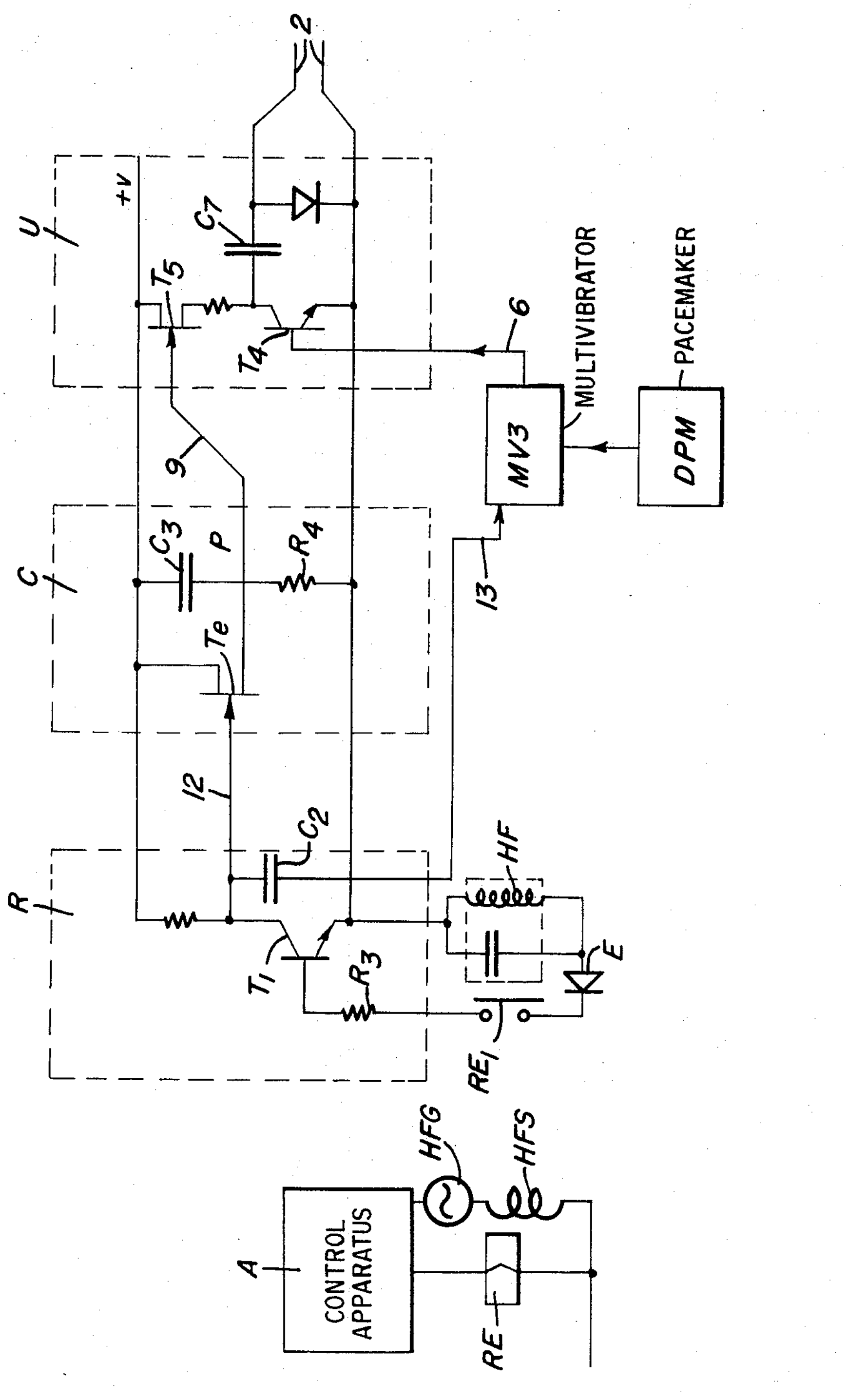

The invention will be explained here in greater detail with reference to the drawing, in which FIG. 1 is a diagrammatical illustration of an embodiment of the PACEMAKER according to the invention adapted for manual control of the amplitude reduction device, FIG. 2 is a block diagram of a second embodiment, FIG. 3 is a block diagram of an embodiment adapted for automatic control of the amplitude reduction device, FIG. 4 is a diagram of another embodiment with automatic control, and FIG. 5 is a block diagram of a third embodiment with automatic or with manual control.

In FIG. 1 DPM is a circuit which may be the detector and pulse generator member of a conventional demand PACEMAKER or simply the pulse generator of a fixed rate PACEMAKER. This circuit emits pulses to a monostable multivibrator MV3 of a predetermined length, for instance 1.8 ms, to an output circuit U every time it is activated. The output circuit U is arranged as illustrated and explained in the specification of U.S. Pat. No. 3,669,120, and both here and in the other figures the reference numerals are the same as used for corresponding parts in the specification of the parent patent.

The output circuit U thus contains a condenser $C_4$ disposed in series with the output leads 2 which transmit the produced pacing pulses to the cardiac musculature and with a transistor $T_4$ which is made conductive by the control pulses from the multivibrator MV3 thereby causing discharge of the condenser $C_4$ through the electrode circuit. The pacing pulse size is thus equivalent to the voltage over the condenser $C_4$ at the moment the transistor $T_4$ is switched on. The condenser voltage is controlled by the dosage circuit C over a voltage follower field-effect transistor $T_5$ which determines the potential to which $C_4$ is recharged after each pacing pulse. This potential depends on the voltage over a condenser $C_3$ in the dosage circuit disposed in series with a charging resistor $R_4$ over the battery which is not shown here. The point of connection P between the condenser $C_3$ and the resistor $R_4$ is connected through a lead 9 to the control electrode of the transistor $T_5$, and it is the voltage in the point P that determines the potential to which the output condenser $C_4$ is charged and thereby the size of the pacing pulse.

The dosage condenser $C_3$ is connected in parallel with a reed contact RE1 which is normally closed and thus short-circuits the condenser $C_3$ so that the potential in the point P is equal to the battery voltage V. In this state the PACEMAKER emits pacing pulses of constant amplitude, which is also the maximum amplitude.

The measuring of the patient's threshold value is performed by a surgeon by holding a permanent magnet M close to the implanted PACEMAKER, whereby the reed contact RE1 will be opened. The charging of the dosage condenser $C_3$ will now start, and as the charging proceeds the potential in the point P will drop and so will the amplitude of the emitted pacing pulses. While the surgeon activates the reed contact and puts the amplitude reduction device into operation he feels the patient's pulse and counts the beats until the failure of a pulse resulting from the pacing pulse amplitude having passed the threshold value. As soon as the surgeon has ascertained the absence of a pulse he removes the magnet M so that the reed contact RE1 is again closed and short-circuits the dosage condenser $C_3$, whereby the potential in the point P is immediately raised to the battery voltage so that the next and following pacing pulses will be of full amplitude. The last pacing pulse, which triggered the heart contractions, represents the threshold value and is identified by the number of pulses from the opening of the reed contact RE1.

In FIG. 2 the block VPM represents the implanted PACEMAKER, which may comprise the same members C, U, MV3 and DPM as shown in FIG. 1, the sole difference between the two apparatus being that FIG. 2 instead of a permanent magnet employs an electromagnet in the form of a relay coil RE for activating the reed contact RE1. In the magnetizing circuit of the relay coil is inserted a switch S which enables the surgeon to first put the relay coil in the proper position relatively to the reed contact RE1 and then to activate the contact by closing the switch S. The result is a more precise point of activation than obtained by using a permanent magnet.

FIG. 3 presents a PACEMAKER VPM of the same type as described above and used in connection with a permanent equipment which may be found for instance in a hospital or at a special control station, and it is adapted to automatically control the functioning of the patient's heart and to cause restoration of the full pacing pulse amplitude on the failure of the heart function. This permanent equipment comprises input or electrode leads EL adapted to be attached to the patient in the same manner as cardiograph electrodes. The voltage pulses generated in the leads EL are amplified by an amplifier F′ and transmitted to a detector D′ which is adapted to activate a monostable multivibrator MV4 on the absence of a heart pulse for more than a predetermined period. The multivibrator MV4 has a pulse time of 20 ms, in which it demagnetizes the relay coil RE and thereby via the reed contact RE1 restores the full pacing pulse amplitude. On the expiration of the 20 ms the reed contact is again opened and the amplitude of the pacing pulse begins to fall. The amplifier F′ and the detector D′ may be coupled to or form part of an electrocardiograph.

In the embodiment of the PACEMAKER according to the present invention illustrated in FIG. 4 the contact used for short-circuiting the dosage condenser $C_3$ to produce full pacing pulse amplitude is the same as used in the PACEMAKER of U.S. Pat. No. 3,669,120, namely a transistor $T_2$ which is controlled from a restoration circuit R through a lead 12. This circuit comprises a transistor $T_1$ the control circuit of which is a series connection of a resistor $R_3$, the reed contact RE1, a rectifier E and a tuned high frequency circuit HF. In the normal state, in which the PACEMAKER is shown in the drawing, the reed contact RE1 is switched off and the transistor $T_1$ is blocked, while the transistor $T_2$ is saturated and short-circuits the dosage condenser $C_3$. For activating the amplitude reduction mechanism is used a permanent equipment comprising an apparatus A which may comprise members F′, D′ and MV4 similar to those shown in FIG. 3, provided that the monostable multivibrator MV4 here is adapted to demagnetize the relay coil RE and simultaneously discontinue the functioning of a highfrequency coil HFG which feeds a highfrequency coil HFS on the absence of a heart pulse for more than a predetermined period. But when RE is magnetized and HFG is activated by starting the apparatus A, the reed contact RE1 will be closed and from the coil HFS oscillations will be induced in the resonant circuit HF, which is tuned to the frequency of the generator HFG. These oscillations are rectified by the rectifier E and thereby a bias voltage is produced which makes the transistor $T_1$ conductive so that its collector voltage drops to a value at which the transistor $T_2$ is blocked. Then the charging of the dosage condenser $C_3$ starts, accompanied by a corresponding voltage drop in the point P and the resultant reduction of the pacing pulse amplitude. When the threshold value is reached $T_1$ will be blocked and $T_2$ saturated to restore the full pulse amplitude. This condition continues during the pulse time of the monostable multivibrator contained in the apparatus A, which must be of sufficient length to permit complete or partial charging of the output condenser $C_4$ and may for instance be 20 ms.

The connection U, through a lead 13 and a condenser $C_2$ between the collector of the transistor $T_1$ and the monostable multivibrator MV3, which emits 1.8 ms control pulses to the output circuit U, causes the generation of such a control pulse when the transistor $T_1$ is blocked on the expiration of the pulse time of the multivibrator in the apparatus A, whereby a pacing pulse of full or at any rate substantially increased amplitude is produced with a minimum of delay after appearance of the ineffective reduced pacing pulse. In the latter case the restoration of the full amplitude may be effected in the period until the next pacing pulse. In the embodiment shown in FIG. 4 the relay coil RE and the reed contact RE1 might be dispensed with altogether and the activation of the amplitude reduction mechanism effected solely by means of the high frequency members HFG, HFS and HF and the rectifier E. But this would involve a certain risk of unintentional activation produced by foreign electromagnetic alternating fields with frequency components adjacent to the resonant frequency of the highfrequency circuit HF.

The block VPM shown in FIG. 5 is a PACEMAKER that may be composed of the same elements as indicated by R, C, U, MV3 and DPM in FIG. 4. For the activating of the amplitude reduction mechanism of this PACEMAKER are used ultrasonic waves, the permanent equipment being an ultrasonic generator LFG which feeds an ultrasonic radiator LS, and the PACEMAKER comprises a piezo-electric crystal X whose a.c. potential produced by the sound oscillations is amplified by an amplifier F'' which feeds a tuned low frequency circuit LF. The oscillations produced therein are rectified by the rectifier E to produce a bias voltage which may make the transistor in the restoration circuit of the PACEMAKER conductive in the same manner as described above. The ultrasonic radiator LS may be controlled manually or automatically as indicated by an arrow.

The structural details of the PACEMAKER according to the present invention may be designed in many other ways than illustrated and described here. The resistor $R_4$ disposed in series with the dosage condenser $C_3$, for instance, may be replaced by a power generator that charges the condenser with a substantially constant current when this condenser is not short-circuited. This measure involves a convenient possibility of calibrating.

What I claim is:

1. An implantable device comprising pulse generator means for producing heart stimulating pacing pulses including amplitude means for setting the amplitude of the pacing pulses, electrode means for introducing the pacing pulses into a heart, and circuit means coupled to said pulse generator means which coacts with the amplitude means thereof to set the amplitude of the pacing pulses produced by said pulse generator means, said circuit means including self-contained control means which when activated will cause the circuit means to change automatically in a continuous manner the coaction with the amplitude means of the pulse generator means and switch means for external actuation while the device is implanted which in repose normally deactivates the control means under which circumstances the circuit means coacts with the amplitude means of the pulse generator means to set the amplitude of the pacing pulses to a fixed value, said switch means when actuated, activates the control circuit whereby the amplitude of the pacing pulses are automatically varied.

2. An implantable device as defined in claim 1, wherein said switch means is a reed switch actuatable by a magnetic member.

3. An implantable device as defined in claim 1, whereby said switch means is an electronic switch means including a tuned high frequency circuit actuatable by a preselected high frequency generator.

4. An implantable device as defined in claim 1 whereby said switch means comprises a reed switch actuatable by a magnetic member in series with a tuned high frequency circuit actuatable by a preselected high frequency generator.

5. An implantable device as defined in claim 1 wherein said switch means is a piezoelectric crystal actuatable at a preselected ultrasonic frequency.

6. An implantable device as defined in claim 1 wherein said pulse generator means includes a condenser the discharge from which is fed to said electrode means and said amplitude means controls the amplitude to which the condenser is charged.

7. An implantable device as defined in claim 1 wherein said amplitude means includes a voltage follower device coacting with said circuit means.

8. An implantable device as defined in claim 7 wherein said voltage follower device is a field effect transistor.

9. An implantable device as defined in claim 1 wherein said circuit means includes a condenser and resistor in series with the junction therebetween connected to said amplitude means.

10. An implantable device as defined in claim 9 wherein said switch means in repose short circuits the condenser of said circuit means and when actuated relieves the short circuit.

* * * * *